B. H. SKELLY.
AUXILIARY BREATHER PIPE ATTACHMENT.
APPLICATION FILED NOV 25, 1918.
1,309,262. Patented July 8, 1919.
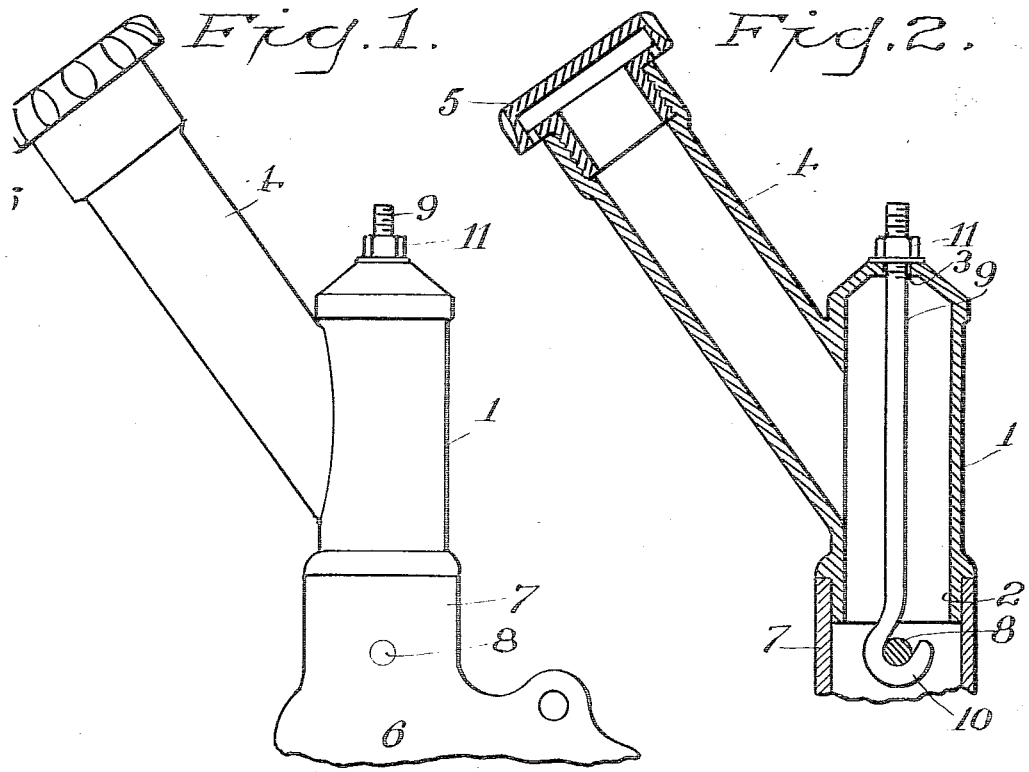
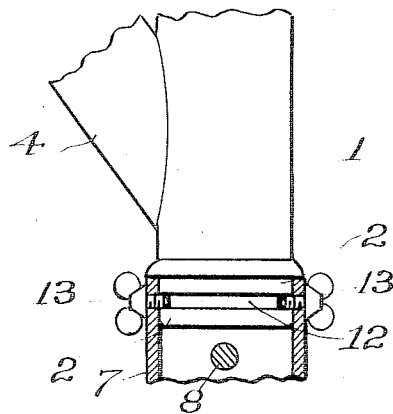
INVENTOR
B. H. Skelly
By
ATTORNEY

UNITED STATES PATENT OFFICE.

BERNARD H. SKELLY, OF BRIDGEPORT, CONNECTICUT, ASSIGNOR TO FREDERICK R. MOUNT, OF BOTSFORD, CONNECTICUT.

AUXILIARY BREATHER-PIPE ATTACHMENT.

1,309,262.                     Specification of Letters Patent.          Patented July 8, 1919.

Application filed November 25, 1918. Serial No. 263,996.

*To all whom it may concern:*

Be it known that I, BERNARD H. SKELLY, a citizen of the United States, residing at the city of Bridgeport, in the county of Fairfield and State of Connecticut, have invented certain new and useful Improvements in Auxiliary Breather-Pipe Attachments; and I do declare the following to be a full, clear, and exact description of the invention, such as will enable others skilled in the art to which it appertains to make and use the same.

This invention relates to an attachment to the breather pipe of an oil reservoir in an automobile, and is in the nature of an auxiliary breather and oil filler pipe, the object being to prevent the splashing of the oil over the motor fan belt, the wires, and the parts inside the hood and to render the replenishing of oil an easy matter without spilling.

In the accompanying drawing

Figure 1 is an elevation showing my improvement attached to the ordinary breather pipe of an automobile oil reservoir—

Fig. 2 a vertical sectional elevation thereof, and

Fig. 3 a broken detail sectional view illustrating a modification in the manner of applying the improvement.

Similar numerals of reference denote like parts in the several figures of the drawing.

In many automobiles, notably the Ford car, the breather pipe is so short and is so located that it is extremely difficult to pour oil into said pipe without spilling. Also, since the breather pipe is comparatively short and substantially vertical, the movements of the gears in the crank casing, and the general motion of the automobile will cause the oil to splash up into the pipe and to exude out through the vented cap of the latter, and this oil is very apt to get onto the fan belt and the timing wires and to create a general condition of filth on all parts beneath the hood of the engine.

In order to overcome these defects the present invention provides means applied to the breather pipe whereby the splashing of the oil out of the latter is prevented, and the oil replenishing operation is greatly simplified, the accompanying illustration showing the invention equipped for application to the breather pipe of a Ford automobile, all of which will be readily understood from the following description.

1 is a hollow casing having a reduced diameter at the bottom as shown at 2 and having its top closed and provided with a central perforation 3.

Extending at approximately an angle of 45° from the side of this casing and in communication therewith is an auxiliary breather tube 4 whose upper extremity is in a plane considerably higher than the top of the casing, this upper or outer end of the tube being provided with a vented cap 5 such as ordinarily applied to breather pipes.

6 represents the usual oil casing or reservoir and 7 the breather pipe therefor.

8 is the timer bolt which, in a Ford automobile, is located in the casing 1 immediately below the breather pipe.

9 is a rod whose lower end is formed into a hook 10 and whose upper extremity is threaded and passed through the perforation 3 and has thereon a nut 11 immediately above the top of the casing 1.

In applying this improvement, the hook 10 is engaged around the bolt 8 and the reduced portion 2 inserted within the pipe 7 in which latter it snugly fits, and the nut 11 is driven on the rod 9 until the casing 1 is firmly anchored to the breather pipe owing to the engagement of said hook with the timer bolt.

It will thus be readily understood that oil cannot splash out through the vented cap at the end of the breather tube 4 and also that the latter, owing to its angular disposition, affords an exceedingly convenient filler pipe for the introduction of the oil.

By providing a wing nut instead of the nut 11, the tube 4 may be readily swung outwardly to afford even more convenience in the pouring of the oil by merely relaxing the nut, and after filling, the tube may be swung inwardly and the nut again tightened.

This swiveled movement of the casing may likewise be effected in other ways, one of which is shown at Fig. 3 where the reduced portion 2 has an annular channel 12 formed therein into which are driven set screws 13 through opposite sides of the pipe 7. By merely relaxing these set screws 13 the casing and the tube may be readily turned as in the manner above set forth,

What is claimed is:—

1. In a device of the character described, the combination with the breather pipe of the oil reservoir of an automobile, of a vertically disposed hollow casing closed at the top and secured at the bottom to said pipe, and a tube extending at an angle of approximately 45° from the side of said casing in communication therewith and with its outer end considerably above the top of said casing, said end being normally closed by a detachable vented cap.

2. An auxiliary attachment for the breather pipe of the oil reservoir of an automobile, comprising a hollow casing having its top closed and its lower end fitted within said pipe, an elongated tube leading at an angle of approximately 45° from the interior of said casing, and a vented detachable cap which normally closes the outer end of said tube.

3. In an auxiliary attachment for the breather pipe of the oil reservoir of an automobile, the combination with the breather pipe and the timer bolt which is horizontally disposed therein, of a hollow casing having its top closed and provided with a central perforation, said casing having its lower end reduced in diameter and fitting snugly within said pipe, a rod having a hook at its lower end which embraces said bolt while the upper end of said rod is threaded and extends through said perforation, a nut engaging the threaded portion of the rod outside the top of the casing and set firmly against the latter whereby the casing is securely anchored to said pipe, and a breather tube leading at an angle of approximately 45° from the side of said casing to a plane considerably above the top of the casing and having its outer end provided with a detachable vented cap.

In testimony whereof I affix my signature.

BERNARD H. SKELLY.